United States Patent [19]
Inami

[11] Patent Number: 4,851,938
[45] Date of Patent: Jul. 25, 1989

[54] CASSETTE LOADING DEVICE
[75] Inventor: Kazumasa Inami, Katsuta, Japan
[73] Assignee: Hitachi, Ltd., Tokyo, Japan
[21] Appl. No.: 160,282
[22] Filed: Feb. 25, 1988
[30] Foreign Application Priority Data
  Mar. 3, 1987 [JP] Japan ................................. 62-46845
[51] Int. Cl.⁴ .............................................. G11B 15/18
[52] U.S. Cl. ..................................... 360/69; 360/96.5
[58] Field of Search ................................ 360/69, 96.5
[56] References Cited
  U.S. PATENT DOCUMENTS
  4,561,031 12/1985 Tanabe .............................. 360/69 X
  4,642,714 2/1987 Miyamoto .......................... 360/96.5

Primary Examiner—A. J. Heine
Attorney, Agent, or Firm—Antonelli, Terry & Wands

[57] ABSTRACT

Disclosed is a magnetic recording/reproducing apparatus including a cassette door openably provided at a cassette port, and a cassette loading mechanism for conveying a cassette between a cassette inserted position and a cassette loaded position. This apparatus further includes a means for detecting the opening of the door of the cassette port; and a control means for starting a cassette unloading operation only if it has been detected by the means for detecting the opening of the door that the door is closed when a cassette unloading trigger button for starting the cassette unloading operation is operated after the cassette has been inserted or loaded.

4 Claims, 5 Drawing Sheets

CASSETTE LOADING DEVICE

BACKGROUND OF THE INVENTION

1. Field of the Invention

The present invention relates to a cassette loading device for a magnetic recording and/or reproducing apparatus having recording or reproducing function, such as a video tape recorder for domestic use. More specifically, the present invention pertains to a cassette loading device of a motor driving type, i.e., a cassette loading device of a front loading type, in which a cassette holder for holding a cassette is moved in horizontal and vertical directions by utilizing the driving force of a motor, i.e., the cassette holder is first moved in the horizontal direction and then in the vertical direction.

2. Description of the Prior Art

In such a cassette loading device of a front loading type, after the cassette has been loaded in the cassette loading device, a cassette unloading trigger button for unloading the cassette from the cassette loading device may be erroneously pressed by a user in a state wherein his or her fingers are being inserted through a cassette port of the cassette loading device. In that case, the fingers are caught between the cassette and a cassette door.

Accordingly, it has been proposed not to open the cassette door provided at the front portion of the cassette port when a foreign matter other than the cassette is inserted. However, such a device is effective only when the cassette door is closed, and is ineffective for a case wherein the cassette door has been opened by inserting the cassette and then the fingers into the cassette port. The device of this type is disclosed in, for example, in the specification of Japanese Patent Laid-Open No. 61-206992.

SUMMARY OF THE INVENTION

An object of the present invention is to provide a cassette loading device which can obviate the above-described problem of the prior art and which is safe to a user.

To this end, the present invention provides a cassette loading device which includes a means for starting a cassette unloading operation only if the door of a cassette port is closed when a cassette unloading trigger button is pressed after a cassette has been inserted or loaded. More specifically, the cassette loading device of this invention includes a means for detecting the opening/closing of the door of the cassette port. Therefore, when the cassette unloading trigger button is pressed after the cassette has been inserted or loaded, the cassette unloading operation is started only if it has been detected that the door of the cassette port is closed.

Thus, when the cassette unloading trigger button is pressed after the cassette has been inserted or loaded, a cassette unloading operation is started, according to the present invention, only if the door of the cassette port has been closed. In consequence, even if the cassette unloading trigger button is pressed with a hand being inserted through the cassette port, the hand is not caught by a cassette which is to be unloaded.

DETAILED DESCRIPTION OF THE PREFERRED EMBODIMENT

Figure 1:
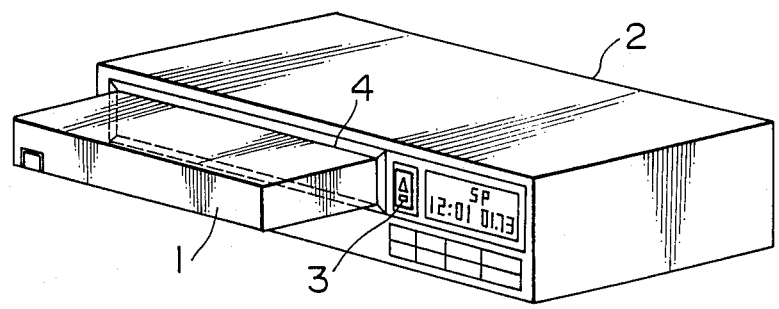
FIG. 1 is a perspective view showing a state wherein a cassette is being loaded.

Embodiments of the present invention will be hereinunder described in detail with reference to the accompanying drawings. Referring first to FIG. 1 which is a perspective view showing a state wherein a cassette is inserted into a cassette port of a video tape recorder, FIG. 2 which is a perspective view of a cassette loading device including a cassette loading mechanism, and FIGS. 3, 4, 5 and 6 which are cross-sectional views illustrating the operation of the cassette loading mechanism of FIG. 2, a cassette loading mechanism 5 includes a cassette holder 6 which is disposed between a right side bracket 21 and a left side bracket 31 and which is supported through guide slots 21a and 21b formed in the right side bracket 21 and guide slots 31a and 31b formed in the left side bracket 31. The cassette loading mechanism 5 also includes a motor 7 specifically used to front-load a cassette. Power of the motor 7 is transmitted to a gear 42 through a worm 41 rotated together with the motor 7, then to a gear 43. A plate-like projecting member 44 with an elongated slot 44a formed therein is fixed to the rotary shaft of the gear 43, and a cassette holder supporter 45a is caused to pass through the elongated slot 44a after it has passed through the guide slot 21a formed in the right side bracket 21. A cassette holder supporter 45b is passed through the guide slot 21b. A cassette guide frame 8 (front holder) is mounted on the right and left brackets 21 and 31.

Figure 2:
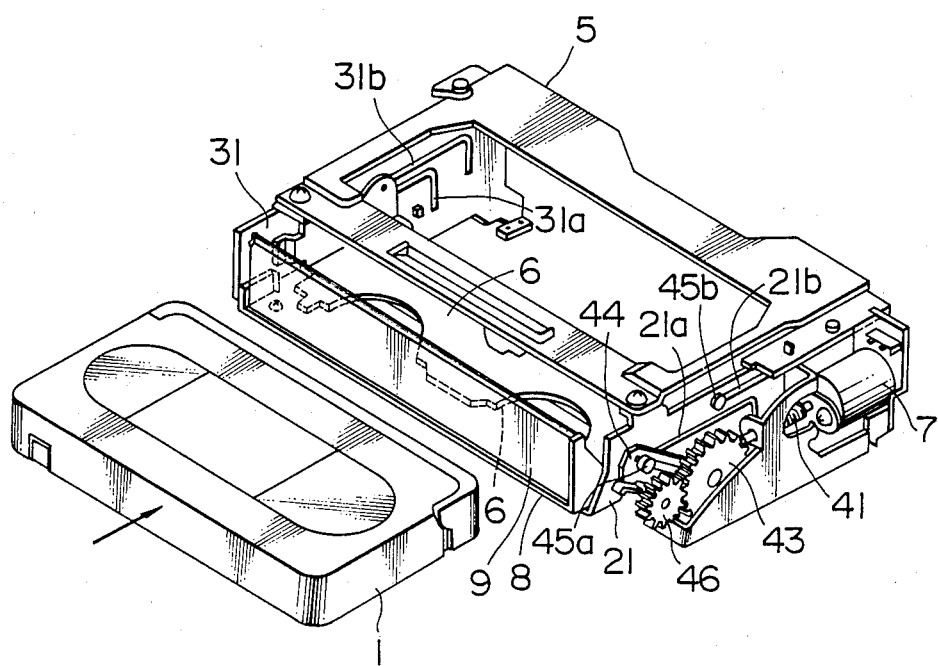
FIG. 2 is a perspective view of a cassette loading mechanism.
Figure 3:
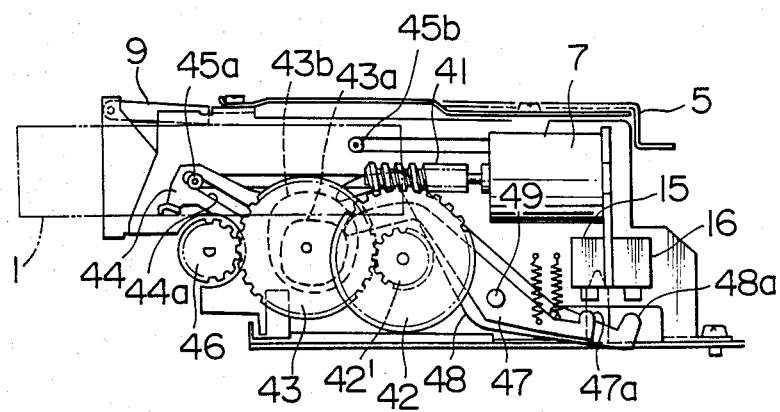
FIGS. 3, 4, 5 and 6 are cross-sectional views illustrating the operation of the cassette loading mechanism.
Figure 4:
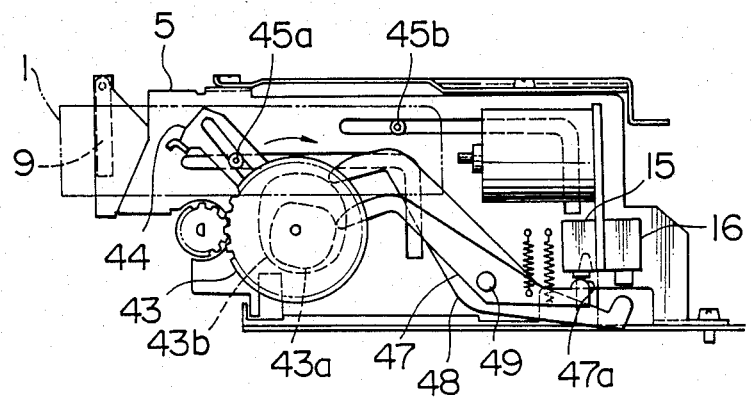
Figure 5:
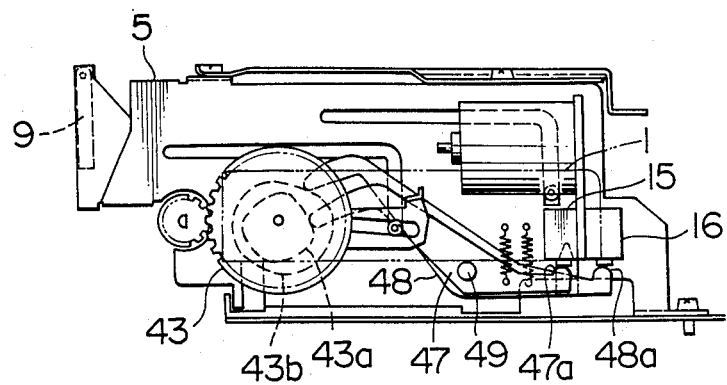

When a cassette 1 is loaded into the cassette holder 6 through a cassette port 4 from a direction indicated by the arrow in FIG. 2, the gear 43 is rotated clockwise through the plate-like projecting member 44 by the supporter 45a of a moving cassette holder 6, as shown in FIG. 4. This causes an arm 47 to be turned counterclockwise about a shaft 49 provided on the right side bracket 21 along a cam 43a provided on the gear 43 so as to turn on a detecting switch 15 by a forward end 47a of the arm 47. The detecting switch 15 serves to detect that the cassette 1 has been loaded at a predetermined position. This in turns causes the motor 7 of the cassette loading mechanism 5 to be actuated The driving force of the motor 7 is transmitted to the gear 43 through the worm 41 and the gear 42, 42'. As the gear 43 is rotated clockwise, the plate-like projecting member 44 pivots in the same direction. As a result the cassette holder 6 receives the rightward force from the plate-like projecting member 44, and is carried inward horizontally while being guided by the guide slots 21a, 21b, 31a, and 31b in a state wherein it is loading the cassette 1. After it has moved through a predetermined distance in the horizontal direction, the cassette holder 6 is conveyed downward in the vertical direction while being guided by the vertical portions of the guide slots 21a, 21b, 31a, and 31b. During this time, an arm 48 is turned counterclockwise about the shaft 49 along a cam 43b provided on the gear 43 so as to turn on a detection switch 16 by a forward end 48a thereto. This stops the operation of the cassette loading mechanism 5 which has moved the cassette 1 through positions shown in FIGS. 3 and 4 to a position shown in FIG. 5.

When the cassette 1 has been loaded at a predetermined position in the manner described above a tape loading mechanism (not shown) of a video tape recorder is actuated in the known manner so as to draw a magnetic tape (not shown) from the cassette 1 and wind it around a cylinder (not shown) on which a recording and reproducing head is loaded before recording is performed on the magnetic tape or reproduction is performed therefrom.

Figure 6:
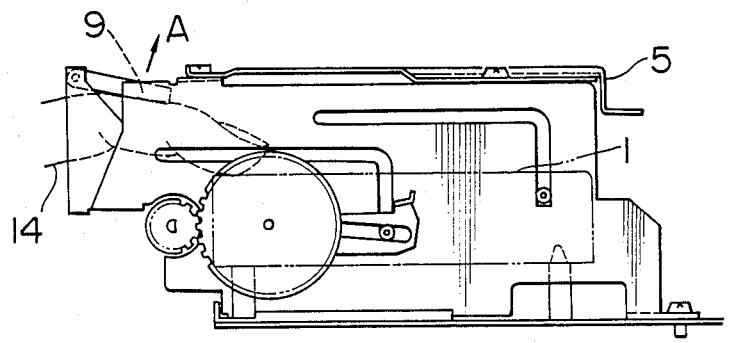

In such a cassette loading device, if a cassette unloading button 3 shown in FIG. 1 is pressed by mistake in a state wherein fingers 14 have been inserted through a door 9 of the cassette port while the cassette has been loaded, as shown in FIG. 6, the cassette 1 is moved from the state shown in FIG. 6 to the state shown in FIG. 3 by the reverse rotation of the motor 7. In consequence, the fingers 14 may be caught between the cassette 1 and the cassette door 9 and be injured.

The present invention is directed to obviating this problem, and its detail will be described below with reference to FIGS. 7 to 10.

Figure 7:
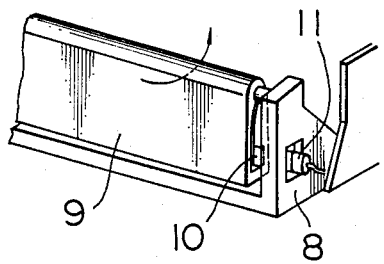
FIG. 7 is a perspective view showing the essential part of one embodiment according to the present invention.

Referring first to FIG. 7 which is a perspective view of the essential part of a first embodiment of the present invention, a cassette holder 8 has a rotatable cassette door 9. A light-receiving element 10 is mounted on one side of the cassette door 9 in a manner that it is buried therein. A light-emitting element 11 is mounted on a cassette inserting portion of the cassette holder 8 in such a manner as to face the light-receiving element 10. The light-receiving element 10 and the light-emitting element 11 constitute a cassette door opening state detecting means. They may be mounted on opposite positions from those described above.

In the structure shown in FIG. 7, the opening state of the door 9 is detected by the light-emitting element 11 provided on the cassette holder 8 and the light-receiving element 10 provided on the door 9. More specifically, while the door 9 is being opened, light emitted from the light-emitting element 11 does not enter the light-receiving element 10. Reversely, the light-receiving element 10 produces an output while the door is being closed so as to enable opening of the door 9 to be detected.

Figure 8:
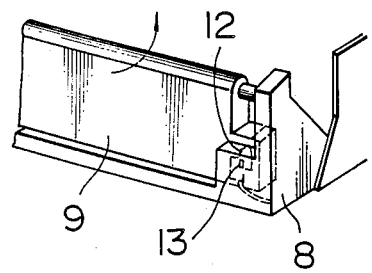
FIG. 8 is a perspective view showing the essential part of another embodiment according to the present invention.

FIG. 8 is a perspective view of the essential part of another embodiment according to the present invention. In this embodiment, switch contacts 12 and 13 are respectively mounted on the cassette holder 8 and the cassette door 9 as a cassette door opening state detecting means.

In the structure shown in FIG. 8, the switch contacts 12 and 13 are in contact with each other while the door 9 is being closed. They are separated from each other while the door is being opened. This enables the opening of the door 9 to be detected.

Figure 9:
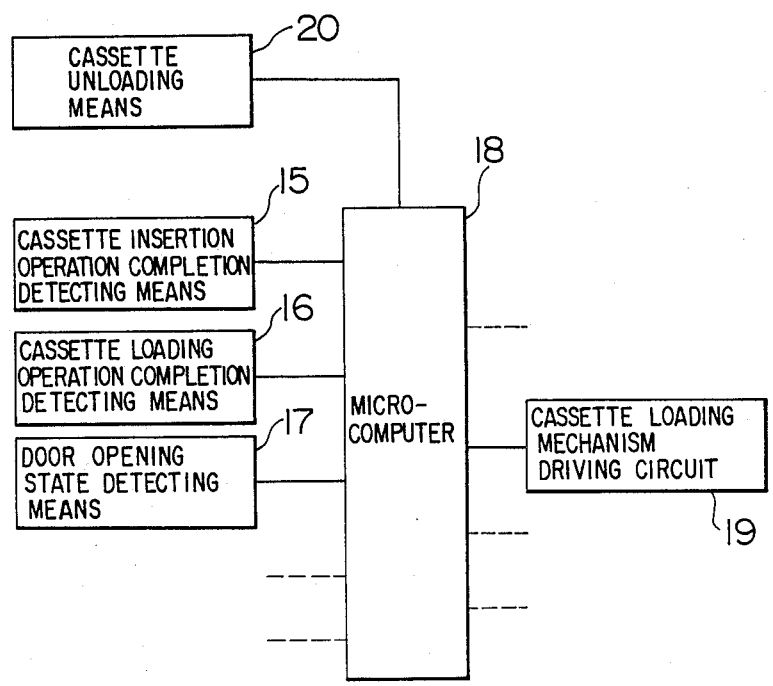
FIG. 9 is a block diagram of a control circuit.
Figure 10:
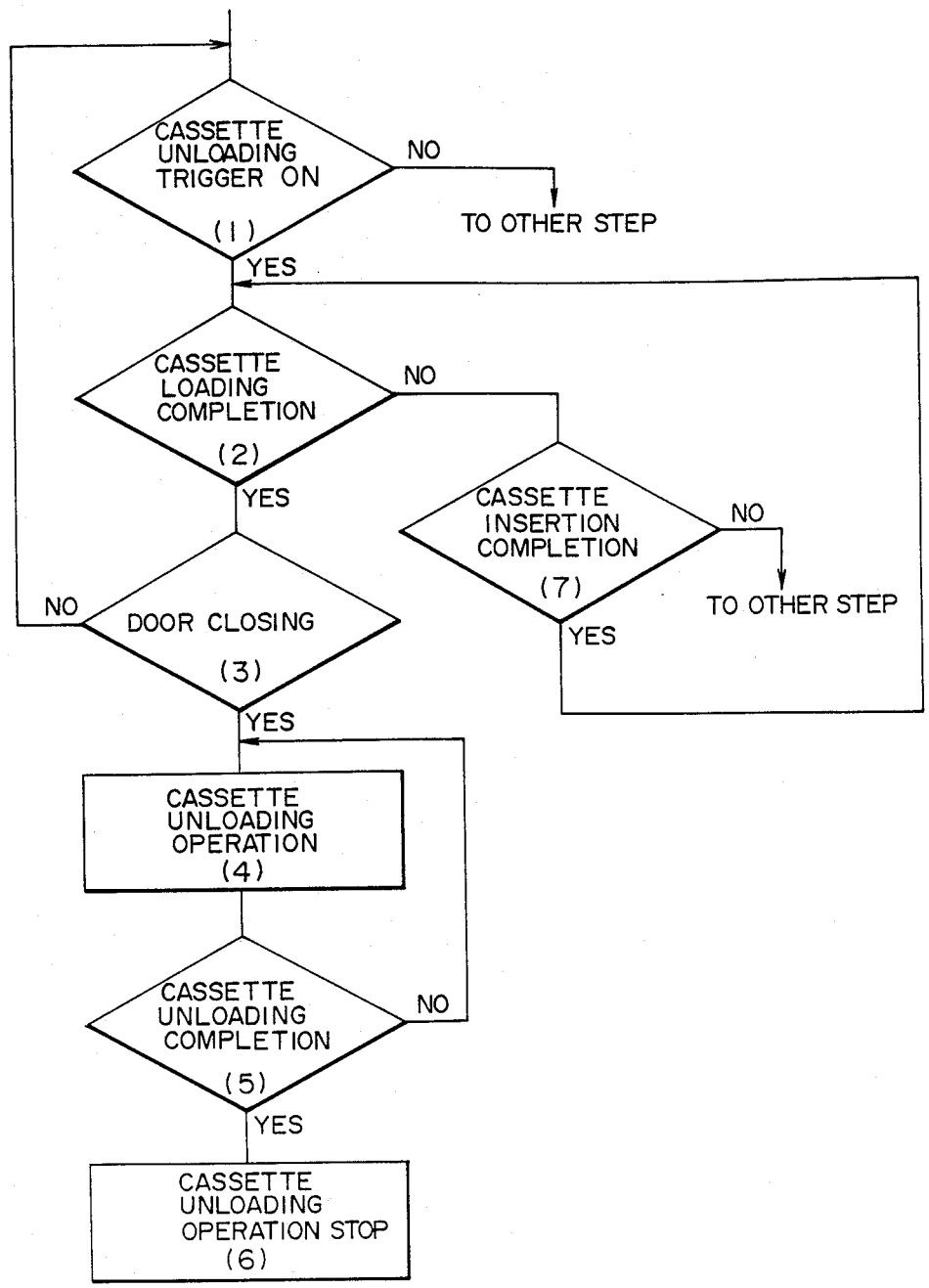
FIG. 10 is a flowchart of the operation of the circuit of FIG. 9.

FIG. 9 is a block diagram of a control circuit for controlling the cassette unloading operation, and FIG. 10 is a flowchart illustrating the operation of the control circuit.

The control circuit includes a cassette insertion operation completion detecting means 15, a cassette loading operation completion detection means 16, a door opening state detecting means 17 for detecting the opening/closing of the door 9 by the light receiving state of the light-receiving element or by the state of the switch contacts, a cassette loading mechanism driving circuit 19, a cassette unloading means 20 including a cassette unloading trigger button 3, and a microcomputer 18 connected to each of these units as a control device.

The operation of the control circuit shown in FIG. 9 will now be described with reference to the flowchart of FIG. 10.

If the cassette unloading trigger button 3 is pressed in the state wherein the cassette is being loaded, an input from the means 17 for detecting the opening of the door 9 which consists of the light-receiving element and the light-emitting element shown in FIG. 7 or of the switch contacts 12 and 13 shown in FIG. 8 is examined in addition to those from the cassette insertion operation completion detecting means 15 and the cassette loading operation completion detecting means 16. If it has been detected by the door opening state detecting means 17 that the door 9 is closed, a trigger signal from the cassette unloading means 20 is supplied through the microcomputer 18 to the cassette loading mechanism driving circuit 19, by which the cassette loading mechanism driving circuit starts the cassette unloading operation in the known manner in accordance with the flowchart of FIG. 10 (steps (1) to (6)). If it has been detected by the door opening state detecting means 17 that the door 9 is opened by the fingers 14 or the like, as shown in FIG. 6, no signal is output to the cassette loading mechanism driving circuit 19 in accordance with the flowchart, and the cassette unloading operation is not performed (steps (1) to (3)).

Any suitable means may be used as a means for detecting the opening of the door 9 in place of those shown in FIG. 7 and 8.

The cassette insertion is detected by the switching-on of the detection switch 15, and the cassette loading is detected by the switching-on of the detection switch 16. However, the insertion and loading may be detected by the switching-on and off of one detection switch, respectively.

As will be understood from foregoing description, when the cassette is to be discharged, the cassette discharge operation is started only when the door is closed according to the present invention. In consequence, the cassette unloading operation is not started if the fingers have been inserted, and an accident can be prevented in which the fingers are caught by an unloaded cassette.

What is claimed is:

1. A cassette loading device, comprising:
   a cassette door openably provided on a cassette port;
   a cassette holder for holding a cassette;
   a cassette loading means for conveying said cassette holder between a first position and a second position;
   a first detecting means for detecting a cassette insertion operation completion when said cassette has been inserted to a predetermined position of said cassette holder through said cassette door and said cassette port so as to operate said cassette loading means;
   a second detecting means for detecting a cassette loading operation completion when said cassette has been conveyed from said first position to said second position so as to stop the operation of said cassette loading means;

a third detecting means provided at said cassette door and a cassette inserting portion of said cassette holder for detecting the opening of said cassette door;

a cassette unloading trigger means including a cassette unloading button, said cassette unloading trigger means for unloading the cassette inserted to said first position or loaded at said second position through said cassette holder, from said cassette port through said cassette loading means; and a control means connected to said third detecting means, said cassette unloading trigger means, and said cassette loading means for starting the cassette unloading operation performed by said cassette loading means only when it has been detected by said third detecting means that said cassette door is closed after said cassette unloading trigger button has been operated.

2. A cassette loading device according to claim 1, wherein said third detecting means is comprised of light-receiving and light-emitting elements respectively provided on said cassette door and said cassette inserting portion of said cassette holder in such a manner as to face to each other.

3. A cassette loading device according to claim 1, wherein said third detecting means is comprised or contacts respectively provided on said cassette door and said cassette inserting portion of said cassette holder in such a manner as to face to each other.

4. A magnetic recording/reproducing apparatus including a cassette door openably provided at a cassette port, and a cassette loading mechanism for conveying a cassette between a cassette inserted position and a cassette loaded position, comprising:

a means for detecting the opening and closing of said door of said cassette port; and a control means for starting a cassette unloading operation only if it has been detected by said means for detecting the opening of said door that said door is closed when a cassette unloading trigger button for starting said cassette unloading operation is operated after said cassette has been inserted or loaded.

* * * * *